(No Model.)

A. G. SMALLEY.
BOTTLE ATTACHMENT.

No. 601,988. Patented Apr. 5, 1898.

WITNESSES
Frank G. Parker
Frank G. Hatter

INVENTOR
Albert G. Smalley

UNITED STATES PATENT OFFICE.

ALBERT G. SMALLEY, OF BOSTON, MASSACHUSETTS.

BOTTLE ATTACHMENT.

SPECIFICATION forming part of Letters Patent No. 601,988, dated April 5, 1898.

Application filed August 2, 1897. Serial No. 646,828. (No model.)

*To all whom it may concern:*

Be it known that I, ALBERT G. SMALLEY, of Boston, in the county of Suffolk and State of Massachusetts, have invented a new and useful Improvement in Bottle Attachments, of which the following, taken in connection with the accompanying drawings, is a specification.

My invention relates to a peculiar manner of connecting handles to glass jars; and it consists in forming the jar with grooves or retaining-beads, placing thin metallic bands around the jar, so as to engage with and be held by said grooves or beads, and uniting the ends of the handle to the said bands, at the place where the ends of the bands unite, by a single soldered joint.

The device is illustrated in the accompanying drawings, in which—

Figure 1:
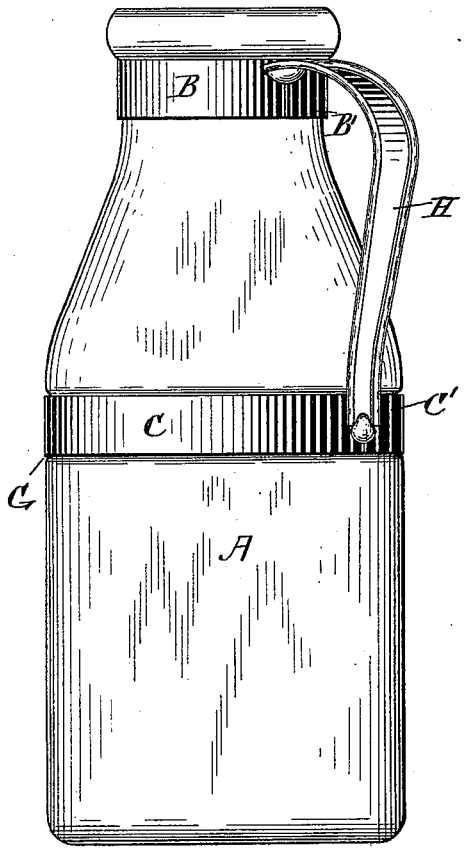
Figure 2:
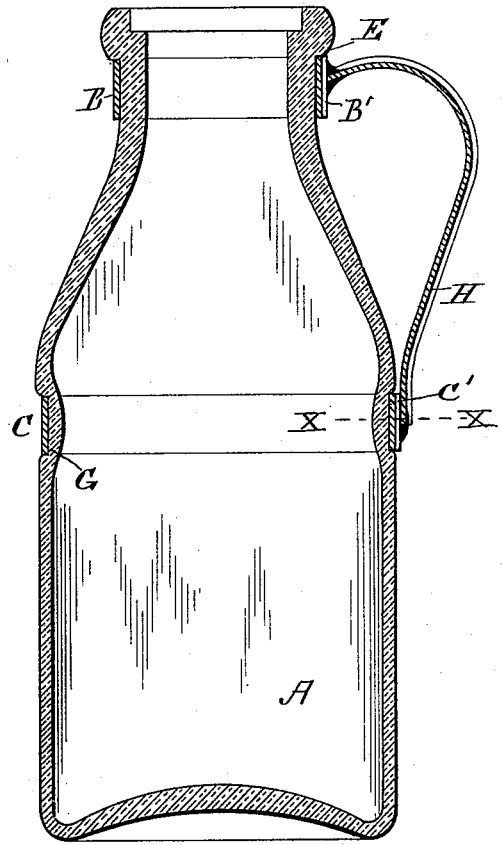
Figure 3:
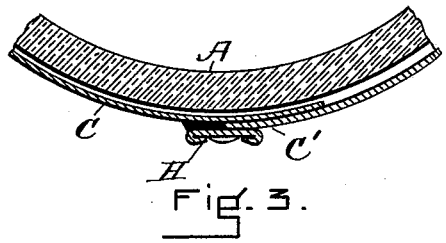
Figure 4:
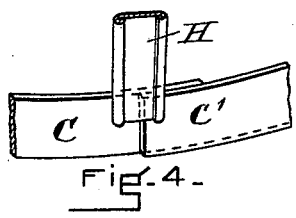

Figure 1 is an elevation showing a jar with my improved handle attachment. Fig. 2 is a vertical section of the same, taken through the center of the jar and handle. Fig. 3 is a horizontal section of a part, the section taken on line $x\ x$ of Fig. 2. Fig. 4 is a view in perspective, showing the junction of the lower end of the handle with the ends of the lower band.

In the drawings, A represents a jar which has a bead E at the upper end of its neck and a groove G around the body part. Immediately under the bead E a band of thin metal B B' is placed, and a corresponding band C C' is placed in the groove G.

The handle H is so placed that its upper end coincides with the juncture of the ends of the band B B'. The lower end of the handle coincides with the juncture of the ends of the lower band C C'. (See Figs. 3 and 4.)

By so arranging the ends of the bands and the ends of the handle that they coincide, as shown, a single operation of soldering will serve to unite one end of the handle to ends of the band and at the same operation join the ends of the band.

By the above-described combination a saving of work and solder is effected, and the work when done is much neater in appearance.

I claim—

A handle device for bottles, jars, &c., consisting of an upper band attached to the neck and having its ends united to each other and to the upper end of the handle by one soldered joint, and having a second band having its ends united to each other and to the lower end of the handle by a single soldered joint substantially as and for the purpose set forth.

In testimony whereof I have signed my name to this specification, in the presence of two subscribing witnesses, on this 31st day of July, A. D. 1897.

ALBERT G. SMALLEY.

Witnesses:
FRANK G. PARKER,
WILLIAM EASON.